United States Patent [19]

Monie

[11] Patent Number: 4,598,607
[45] Date of Patent: Jul. 8, 1986

[54] PROGRAMMER CONTROL DEVICE

[75] Inventor: Jean Monie, Cluses, France

[73] Assignee: Carpano et Pons, France

[21] Appl. No.: 693,650

[22] Filed: Jan. 22, 1985

[30] Foreign Application Priority Data

Feb. 3, 1984 [FR] France ............................. 84 02241

[51] Int. Cl.[4] ........................................... F16H 53/00
[52] U.S. Cl. ................................. 74/568 T; 74/576;
74/577 S
[58] Field of Search .................. 74/568 T, 576, 577 S

[56] References Cited

U.S. PATENT DOCUMENTS

| | | | |
|---|---|---|---|
| 3,156,123 | 11/1964 | Denny | 74/568 T X |
| 3,717,043 | 2/1973 | Cartier | 74/568 T X |
| 3,857,293 | 12/1974 | Godwin | 74/568 T X |
| 4,038,884 | 8/1977 | Chestnut | 74/568 T |
| 4,467,664 | 8/1984 | Willigman | 74/568 T |

Primary Examiner—Harold W. Weakley
Attorney, Agent, or Firm—Darby & Darby

[57] ABSTRACT

This programmer control device comprises a programme-cam unit and a reversing cam unit disposed coaxially and driven for step by step rotation by rocking pawls, notably a pawl cooperating with concentric sets of teeth. The beak of this pawl comprises a stud engaging a slot formed in the first portion of a movable deceleration element having its second portion connected to the first portion by a spring and provided with an extension adapted to be locked in its forward or operative position by the movable core of an electromagnet. The slot formed in the first portion is so inclined that upon each backward movement of the pawl the fall of the beak of this pawl behind each tooth is damped out by the stud in sliding contact with the side of the slot, so as to carry along the deceleration element which may be of the frictional contact type. On the other hand, when the second portion of the movable deceleration element is locked by the core of the electromagnet upon each backward movement of the pawl which in this case cannot drive the first portion against the force of the spring, the stud is caused to slide in its slot and to lift the beak of the pawl off the teeth of the corresponding concentric set of teeth.

6 Claims, 8 Drawing Figures

PROGRAMMER CONTROL DEVICE

BACKGROUND OF THE INVENTION

The present invention relates to programmer control device of the type comprising a programme-cam unit and a reversing cam unit disposed coaxially to each other and adapted to be driven for step by step rotation by at least one of a plurality of spring-loaded pivoting pawl. The beak of each pawl is adapted to engage a movable toothed member kinematically connected to the corresponding cam unit, an automatic control system being adapted to control the step by step rotation, at a fast rate, of the programme-cam unit.

THE PRIOR ART

In known programmer control devices of this type, such as the system disclosed in the French Patent No. 2,162,073, no means are provided for damping out the fall of the beak of the pawl driving the reversing programme-cam unit in the forward direction behind each tooth of the corresponding movable toothed member. Now this constitutes an obvious inconvenience for this pawl operates at a relatively fast rate, for example once every second, thus generating an excessive noise unpleasant to the operator, and also a relatively premature wear of the pawl. Another inconvenience of this known device lies in the fact that the fast step by step forward motion of the reversing programme-cam unit is not discontinued each time the programme-cam unit is driven step by step automatically, as a rule at the same fast rate as the reversing programme-cam unit, when a number of steps, corresponding to a predetermined number of functions, must be skipped rapidly because they are unnecessary for obtaining the programme in progress previously selected by the operator. Now, on the one hand, the time corresponding to the fast-rate forward feed of the programme-cam unit varies as a function of the orders received from the automatic means controlling this unit, and on the other hand, during this time period the reversing programme-cam unit rotates through a predetermined number of steps, without any operative functional relationship between the numbers of steps accomplished by the two cam units, respectively. Thus, when the automatic control device, consisting for example of an electromagnet, is deenergized, the programme cam unit cannot revert systematically to the electrical configuration of the reversing cam unit, that is, identical with the one which existed before the beginning of the fast forward-feed phase of said programme-cam unit. Consequently, it is sometimes impossible to obtain the necessary safety features for the complete programmer system. Thus, for instance, it is scarcely possible to control the time corresponding to a well-defined delay period, for example 60 seconds, elapsing during the operation of the reversing cam unit after the programme-cam unit has been moved forward at a fast rate through any given number of steps. In fact, if both cam units are rotated for example at the same rate in the forward direction, a fast forward motion of the programme-cam unit during, say 25 seconds, will reduce by the same value (25 seconds) the duration of the following delay period controlled by the reversing cam unit. Therefore, this delay period or time-lag lasts only 35 seconds instead of one minute for example, and according to the function to be performed during this delay period it may be necessary to pass through an additional delay period which would involve the loss of, say, one step in the programme-cam unit.

The programmer control device according to the present invention is characterized in that the beak of the pawl driving the reversing cam unit is operatively connected through a lost-motion coupling device to a movable deceleration element including a section of which the backward path, at the end of each forward movement of the pivoting pawl and deceleration element is adapted to be intersected by an automatic control element when, simultaneously, the step by step forward movement of the programme-cam unit is driven at a fast rate. The lost-motion coupling device consists of a stud projecting laterally from the pawl beak or the deceleration element, said stud slidably engaging an elongated slot formed in the deceleration element or the pawl beak. This elongated slot extends across the path of the deceleration element, at the level of the pawl beak, and is so oriented that on the one hand when the pawl beak drops behind each tooth of the corresponding movable toothed member, the path followed by said beak is inclined with respect to the longitudinal axis of the slot so that the stud and a longitudinal side of the slot are in mutual sliding contact, thus driving the deceleration element backwards, and such that on the other hand, after the deceleration element has been locked against motion by the automatic control element, when the pawl pivots in the reverse or backward direction the path followed by the pawl during this pivotal movement is inclined to the longitudinal axis of the slot and causes the relative sliding movement between the stud and the slot in a direction causing the beak to clear the teeth of the corresponding movable member.

SUMMARY OF THE INVENTION

It is the primary object of the present invention to provide a programmer control device of which the operation is relatively more noiseless than hitherto known devices of this character by damping out the fall of the beak of the feed pawl of the reversing cam unit behind each tooth of the corresponding movable toothed member and, at the same time, providing the necessary safety of operation of the device by stopping the step by step forward movement of the reversing cam unit during each step by step feed movement of the programme-cam unit at a fast rate, so that this programme-unit, when its automatic control device becomes inoperative, is restored systematically to the electrical configuration of the reversing cam unit, identical with the configuration existing before the beginning of the fast-rate forward motion of said programme-cam unit.

THE DRAWINGS

DESCRIPTION OF THE PREFERRED EMBODIMENTS

Figure 1:
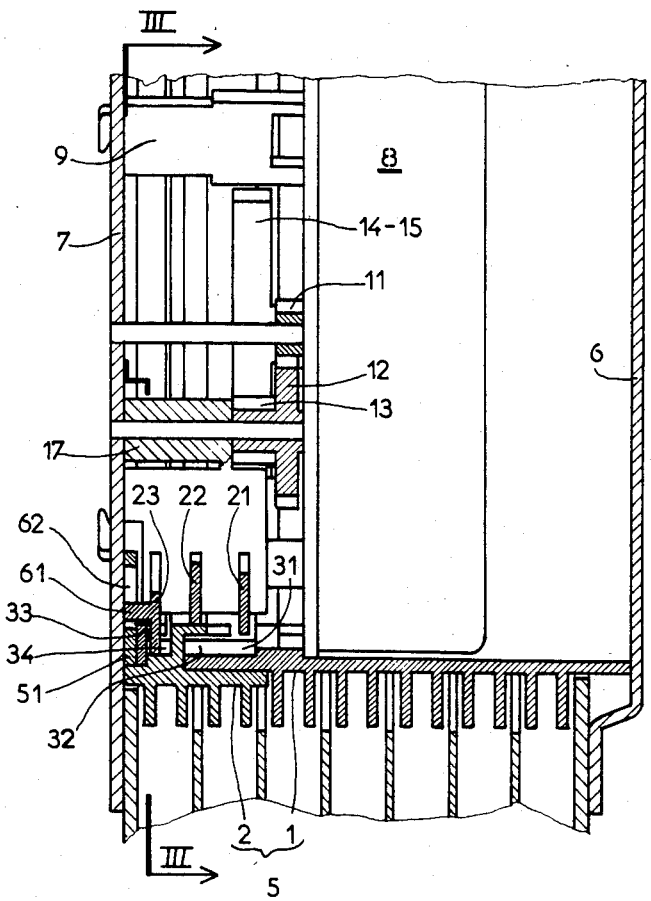
FIG. 1 is a fragmentary radial section taken along the line I—I of FIG. 3, showing a first form of embodiment of the device of this invention.
Figure 2:
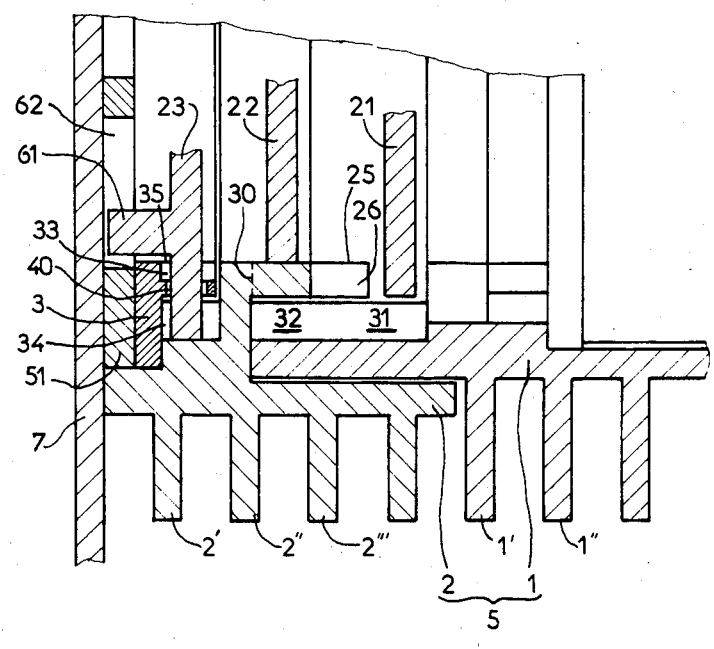
FIG. 2 illustrates on a larger scale one portion of the device of FIG. 1.
Figure 3:
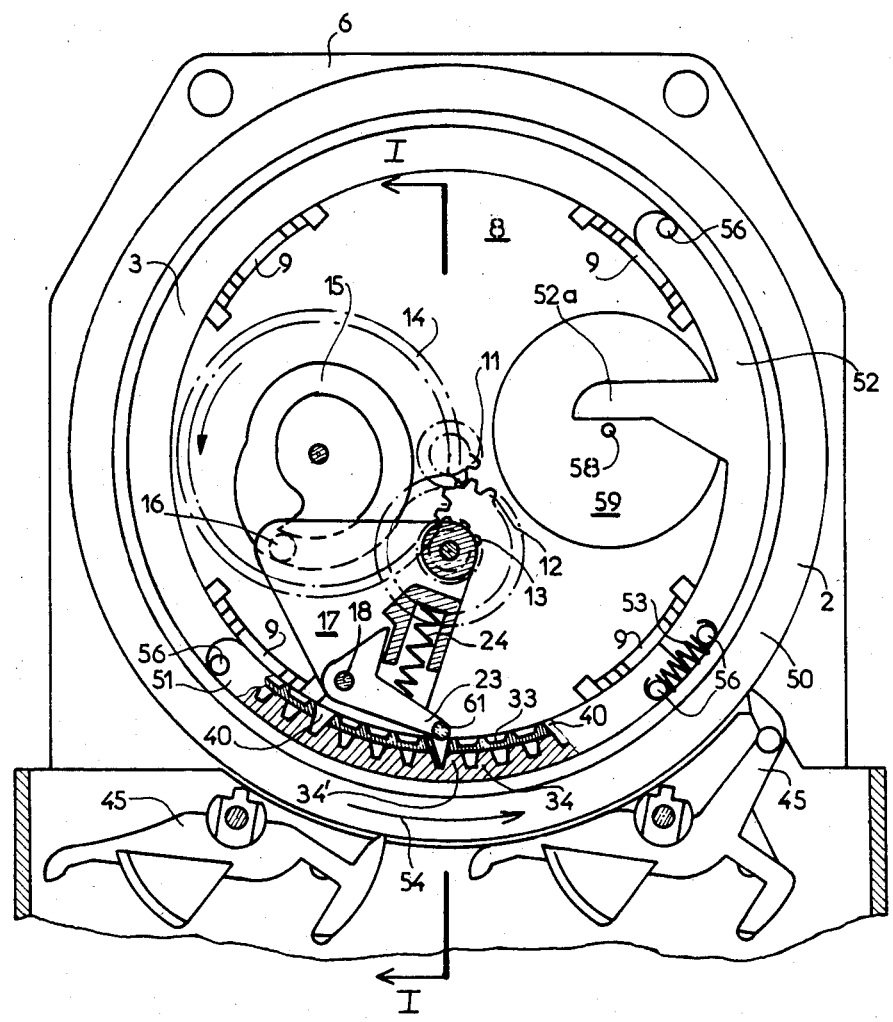
FIG. 3 is a section taken along the line III—III of FIG. 1.

Referring first to FIGS. 1-3 of the drawings, the programmer control device according to the present invention comprises a rotary cam unit 5 which, in this typical form of embodiment, is hollow and held in the axial and radial directions between a pair of metal plates 6 and 7. An electric micromotor 8 rigidly connected to plate 7 by means of pillars 9 is housed within this rotary cam unit 5. The output shaft of this micromotor 8 carries a pinion 11 in constant meshing engagement with a toothed wheel 12 rigid with a pinion 13 meshing in turn with another toothed wheel 14. This toothed wheel 14 is rigid with a feed cam 15. Assuming that in this specific example the micromotor 8 rotates at 750 r.p.m., the numbers of teeth of the toothed elements 11, 12, 13, 14 are selected to cause the feed cam 15 to rotate at the rate of one revolution per second.

this feed cam 15 consists of a hollow groove of spiral configuration formed on one of its main faces. This cam groove is engaged by a driving stud 16 projecting from a rocking support 17 adapted to perform one oscillation at each revolution of the feed cam. This rocking support 17 is provided in this example with three feed pawls 21, 22, 23 disposed side by side and fulcrumed about a common arbor 18 secured to the rocking support 17.

The first feed pawl 21 is adapted to engage gullet teeth formed on the inner periphery of a first toothed annulus 31 rigid with a first section 1 of cam unit 5, which constitutes the programme-cam unit. This first section comprises in fact external contours 1', 1", etc. of the programme-cam proper. This first feed pawl 21 is constantly urged by a traction spring (not shown) away from the teeth of the first toothed annulus 31, except when an automatic control device, for example an electromagnet, also not shown in the drawings, is actuated for example under the control of an external sensor. The first pawl 21 is then pushed for engagement with the teeth of the first toothed annulus 31, for example through the medium of a resilient lever, as disclosed in the above-mentioned French Patent No. 2,162,073.

The cam unit 5 comprises a second cylindrical section 2 which, in this example, is mounted for rotation about the first section 1 and constitutes a reversing cam unit. This second section 2 comprises in fact on its outer periphery a set of so-called "reversing" cams 2', 2", 2'41 generally provided for controlling the change in the direction of rotation of the motor driving the drum of a household washer. It also carries a cylindrical extension 26 extending inward of the inner periphery of the first section 1.

The second feed pawl 22 is constantly urged by a coil compression spring 24 housed in a recess of the rocking support 17 against the plain inner periphery 25 of said cylindrical extension 26. A pair of diametrally opposed orifices 30 (FIG. 2) formed through said extension 26 open into the plain inner periphery 25 against which the second feed pawl 22 is caused to bear. These orifices have a dimension sufficient to permit the passage of the beak of said pawl 22 so that this pawl can cooperate with the second toothed annulus 32 rigid with the first section 1 of cam unit 5. In this exemplary form of embodiment this second toothed annulus 32 is identical with the first toothed annulus 31 and constitutes an extension thereof. This second toothed annulus 32 is disposed just behind the two orifices 30.

As illustrated in FIGS. 1-3, the third feed pawl 23 is constantly urged by another coil compression spring 24 on the one hand against a third toothed annulus 33 comprising sixty teeth in this example, this third annulus 33 being rigid with the inner contour 35 of a rate reduction ring 3 (FIG. 2) rotatably mounted within the reversing cam unit 2, and on the other hand through orifices 40 extending through said rotary ring 3 against a fourth toothed annulus 34 also provided with sixty teeth in this example, this fourth toothed annulus 34 being rigid with the reversing cam unit 2. The reduction ring 3 actually bears against the tips of the teeth of the fourth toothed annulus 34 and comprises, in this example, fifteen orifices 40 disposed at spaced angular intervals along its periphery. The fourth toothed annulus 34 is thus located just behind the fifteen orifices 40.

Cams 1', 1" . . . , 2', 2", 2''' . . . are provided for actuating bell-crank levers 45 controlling in turn switch means not shown in the drawings.

Figure 5:
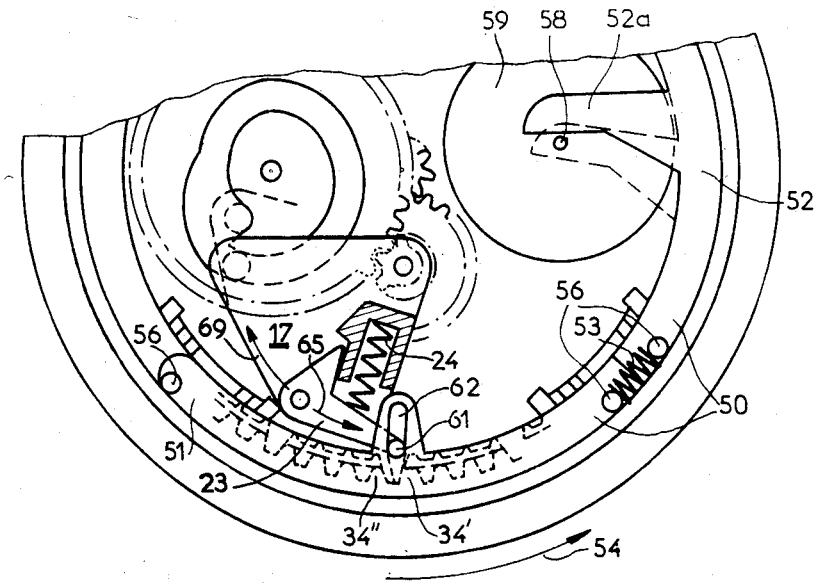
Figure 6:
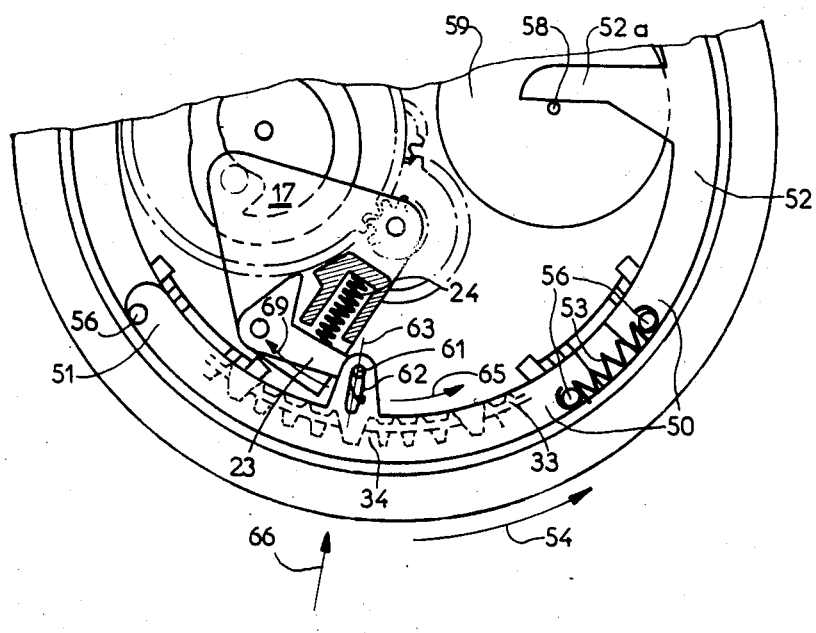

The beak or pawl 23 driving the reversing cam unit 2 is connected through kinematic means of the lost-motion sliding type to the first portion 51 of a movable deceleration element 50 having its other portion 52, disposed after and before the first portion 51, constantly urged by resilient means, consisting for example of a traction spring 53, against said first portion 51. The second portion 52 is thus pushed forward by the first portion 51 in the direction of the arrow 54 when the rocking support 17 and the feed pawls 21, 22, 23 are also caused to pivot in the forward direction along a path 65 (FIGS. 5 and 6). In this exemplary form of embodiment both portions 51 and 52 of deceleration element 50 consist of segments of annular rings disposed concentrically to cam units 1 and 2 and adapted to slide in frictional contact between the end of reversing cam unit 2 (and more particularly between the reduction ring 3, in this example) and the plate limiting the axial movement of said reversing cam unit 2. The means for guiding said portions 51 and 52 comprise lateral studs 56 carried by said portions and slidably engaged in elongated slots formed in plate 7, concentric to cam units 1 and 2 and not shown in the drawing. A stud 56 of each portion 51, 52 of deceleration element 50 acts as a means for anchoring the coupling spring 53. This spring 53 is shown in FIGS. 3, 5 and 6, to afford a clearer understanding of the mode of operation of the system, but in fact it should be omitted from these Figures since it is anchored to the corresponding ends of two studs 56 which projects from the face of plate 7 opposite the face bearing against said deceleration element 50.

As illustrated in FIGS. 3, 5 and 6, the second portion 52 of the deceleration element comprises a rigid internal extension 52a of which the backward path in the direction opposed to arrow 54, at the end of each feed movement of the third pivoting feed pawl 23 and of the deceleration element 50 in the direction of this arrow 54, is adapted to be intersected by an automatic control element when, simultaneously, the step by step feed of programme-cam unit 1 is controlled at a fast rate by its automatic control device actuating the first pawl 21. The automatic control device consists for example of the movable core 58 of an electromagnet 59 housed within cam unit 5.

The lost-motion sliding coupling means providing the kinematic connection between the beak of pawl 23 and the first portion 51 of deceleration element 50 consists for example of a stud 61 supported laterally by the beak of pawl 23 and slidably engaged in an elongated slot 62 formed in said first portion 51. This elongated slot 62 extends across the path 54 of the first portion 51 of the deceleration element 50 in a direction such that, when the beak of pawl 23 drops behind each tooth of the third toothed annulus 33 or of the fourth toothed annulus 34, the path 60 (FIG. 4) of said beak is inclined with respect to the longitudinal axis 63 (FIG. 4) of slot 62, whereby the stud 61 and a longitudinal side of slot 62, in fact the rear side 62b in this example, are caused to slide along each other, thus driving the deceleration element 50 backwards in a direction opposed to 54. On the other hand, the elongated slot 62 is also so oriented that, after the second portion 52 of deceleration element 50 has been locked by the automatic control element 58 (FIG. 6), when the pawl 23 pivots backward in the direction 69, and causes the first portion 51 of deceleration element 50 to move in the direction opposed to 54 against the resistance of connecting spring 53, the path 69 (FIG. 6) of the pivotal movement of pawl 23 is inclined in relation to the longitudinal axis 63 of slot 62 in order to cause the relative sliding movement of stud 61 and of the longitudinal rear side 62b of slot 62 in a direction causing the beak of pawl 23 to clear the teeth of the corresponding toothed annulus 33 or 34.

When the micromotor 8 is energized, the feed cam 15 performs sixty revolutions per minute and the pawl support 17 as well as the three pawls 21, 22 and 23 oscillate sixty times per minute. The first pawl 21 oscillates for instance loosely, that is, without engaging the teeth of the first toothed annulus 31. The second pawl 22, during its oscillations, remains in engagement with the plain portion 25 of extension 26. The third pawl 23, during each oscillation, drives the third toothed annulus 33 of reduction ring 3 through an angular distance corresponding to one tooth, whereby this reduction ring 3 will perform one revolution in one minute. Considering the presence of the fifteen orifices 40, the third pawl 23 drives through these orifices 40, every four teeth, each time one tooth, the fourth toothed annulus 34 of the reversing cam unit 2, so that this unit 2 will accomplish one revolution during four minutes. During this step by step movement of reversing cam unit 2 and during each revolution of this reversing cam unit 2 the second pawl 22 drops successively into each one of the two orifices 30 and each time drives to the extent of one tooth the second toothed annulus 32 of programme-cam unit 1, this unit 1 being thus caused to move through an angle corresponding to one step every two minutes.

Figure 4:
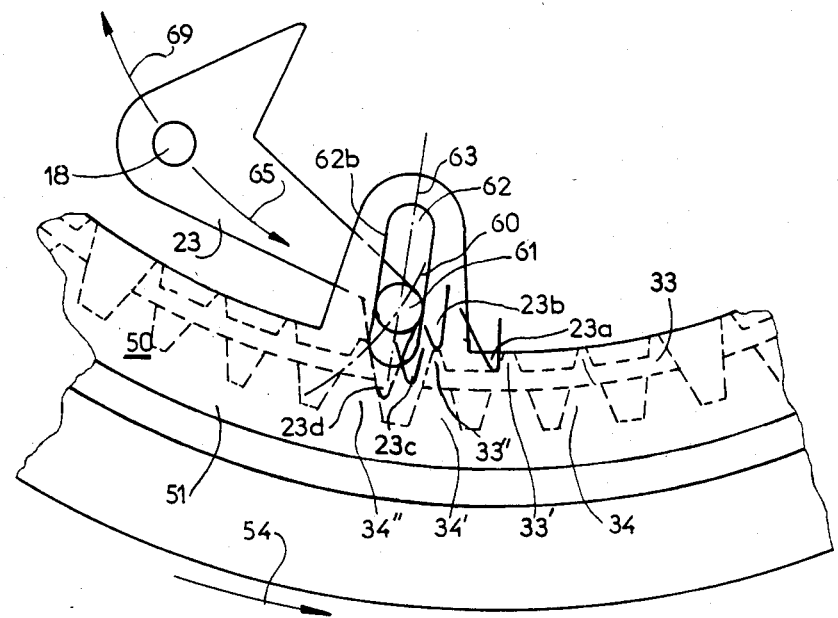
FIGS. 4–6 are fragmentary views showing the relative positions of the component elements of the device during various phases of its operation.

At each forward oscillation of the third pawl 23 in the direction of the arrow 65 (FIG. 5), the beak of this pawl 23 firstly carries along, in the direction of the arrow 54, the first portion 51 of deceleration element 50 which pushes in turn the second portion 52. When the beak has been fed through its maximum distance, the extension 52a of said second portion 52 is located beyond the movable core 58 of electromagnet 59 (FIGS. 3 and 5). The beak of pawl 23 is then positioned at 23a, as shown in thick lines in FIG. 4, after having pushed one of the teeth 33' of toothed annulus 33 in the direction 54. This beak 23 then drives backwards (i.e. in the direction opposed to 54) the first portion 51 which is followed by the second portion 52 due to the provision of the connecting spring 53. Then the beak 23 passes through the intermediate position 23b after rising on the next tooth 33", whereafter, due to the action of spring 24, it begins to drop behind the next tooth 34' of annulus 34 along the path 60 (FIG. 4). At that time the stud 61 of beak 23 slides along the rear longitudinal side 62b of the elongated slot 62 and carries along the deceleration element 50 backwards, that is, in the direction opposed to 54. The beak clears intermediate positions such as 23c before reaching a position 23d (FIG. 4) in which it engages the side of tooth 34", this movement being damped out by the frictional contact between the deceleration element 50 and its guide elements. The rocking support 17 and extension 52a are then in the positions shown in dash lines in FIG. 5.

When the rocking support 17 resumes its forward movement (arrow 65), the beak of pawl 23 slides along the side face of tooth 34" until it engages the rear hollow of tooth 34' and pushes this tooth 34' in turn in the forward direction until it reaches the position shown in FIGS. 3 and 5.

As long as the automatic control element 58 is not actuated, the pawl 23 continues its operation as described hereinabove, its fall being damped out by deceleration element 50.

When the automatic control device is actuated by its external sensor for causing the step by step movement of programme-cam unit 1 at a fast rate through the first pawl 21, the movable core 58 of electomagnet 59 locks the extension 52a and consequently the second portion 52 against motion. Thus, during the next backward movement of pawl 23 (in the direction opposed to 65, as shown in FIG. 5), the second portion 52 remains in its locked condition and only the first portion 51 is driven in the direction opposed to 54, against the resistance of connecting spring 53. The force of this spring 53 is sufficient for causing the stud 61 to slide in the direction of the arrow 66 in the elongated slot 62 while compressing the spring 24 of the third pawl 23 which is thus lifted off the tooth 33 and 34 during the successive oscillations of the pawls. Consequently, the reduction ring 3 and reversing cam unit 2 are no more driven for step by step rotation by pawl 23, as long as the programme-cam unit 1 is actuated at a fast rate.

When this fast-rate actuation ceases, the movable core 58 releases the extension 52a of second portion 52, and both portions 51 and 52 of deceleration element 50 are again driven for oscillation by the pawl 23, as described in the foregoing.

Figure 7:
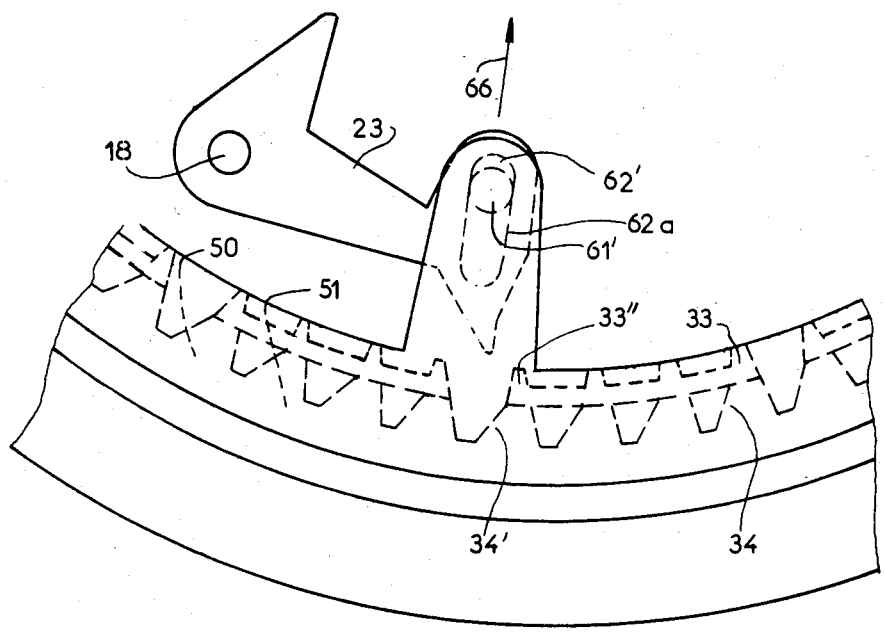
FIG. 7 illustrates on a larger scale one portion of a second form of emobdiment of the device of the present invention, during the same phase of operation as that shown in FIG. 6.

In the second form of embodiment, illustrated in fragmentary view in FIG. 7, the elongated slot 62' is formed in the beak of the third pawl 23 and the first portion 51 of deceleration element 50 is provided with a lateral stud 61'. All the other component elements are identical with those of the first form of embodiment shown in FIGS. 1-6.

The mode of operation of the second form of embodiment is similar to that of the first form of embodiment.

When the beak of pawl 23 drops behind the teeth 33" and 34', its fall is damped out by the front longitudinal side 62a of elongated slot 62', this side sliding along stud 61' and causing the backward movement of deceleration element 50. When the extension 52a of portion 52 is locked by the movable core 58 the tractive effort exerted by connecting spring 53 causes the sliding movement (in the direction of the arrow 66) of the longitudinal side 62a of slot 62', against the stud 61', thus lifting the beak of pawl 23 clear of the path of teeth 33 and 34.

Figure 8:
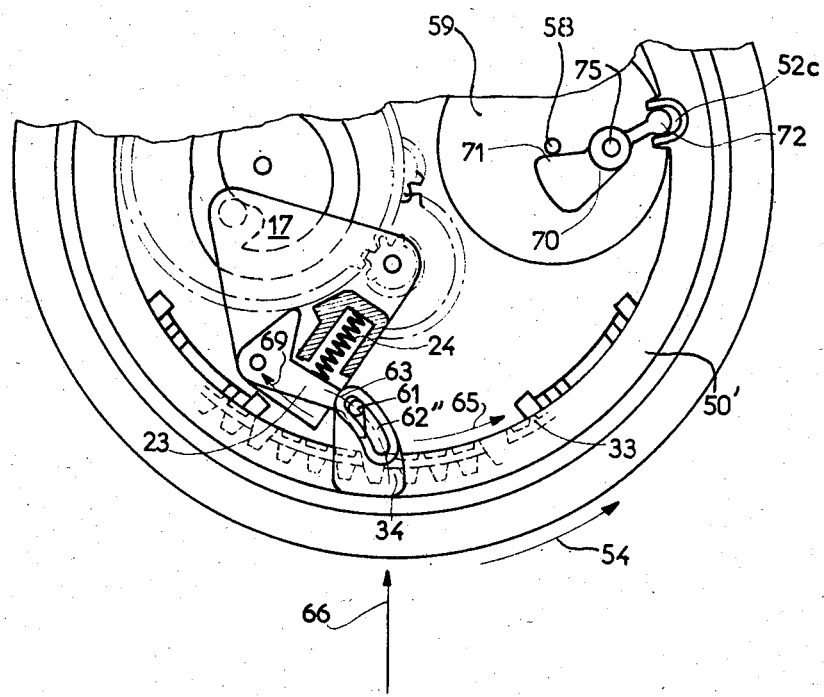
FIG. 8 is a fragmentary view of a third form of embodiment of the invention, during the same phase of operation as that shown in FIG. 6.

In the third form of embodiment shown in fragmentary view in FIG. 8 the movable deceleration element 50 comprising two portions 51 and 52 interconnected by a spring 53, which is contemplated in the first form of embodiment (FIGS. 1–6) is dispensed with and replaced by a movable deceleration element 50' consisting of a single element of annular configuration. This annular element is disposed concentrically in relation to cam units 1 and 2, and adapted to slide in rotational frictional contact between the plate 7 limiting the axial movement of reversing cam unit 2 and the end of this cam unit. In this example the movable deceleration element 50' is rotatably mounted in a circular recess formed in the end portion of reversing cam unit 2, and is thus located more accurately between reduction ring 3 and plate 7.

The movable deceleration element 50' comprises a portion 71 of which the path in the backward direction is adapted to be intersected by the automatic control element 58 at the end of each forward movement of rocking or pivoting pawl 23 and movable deceleration element 50'. This portion 71 consists of the first end of a rocking lever 70 fulcrumed about a fixed pivot pin 75, the other spherical end 72 of this lever 70 being pivotally connected to a matching socket 52c formed in the movable deceleration element 50'. In this example, the first end 71 of lever 70 is somewhat nearer to the axis of cam units 1, 2 than the opposite end 72, this arrangement permitting, during each to and fro movement of pawl 23, of maintaining the amplitude of the movement of said first end 71 engaging the automatic control element 58 at a value at least equal to that of pivot socket 52c of element 50'.

The elongated slot 62 of the first form of embodiment (FIGS. 1–6) is replaced by an elongated slot 62" of which the end remotest from the annular element constituting the movable deceleration element 50' proper is curved in the rearward direction (FIG. 8) and has a length such that, when the first end 71 of lever 70 and therefore of element 50' has been locked by the automatic control element 58, the beak of pawl 23 can recede sufficiently, during each backward oscillation (arrow 59) of pawl unit 23, while said beak is being lifted (arrow 66) off the path of teeth 33 and 34.

All the other component elements are identical with those of the first form of embodiment described hereinabove with reference to FIGS. 1–6, and the assembly also operates in a manner similar to that of said first form of embodiment.

In a modified version of this third form of embodiment (FIG. 8), not shown in the drawings, the lever 70 is dispensed with and replaced by a rigid element incorporated in the movable deceleration element 50', identical with the portion 52a described in connection with the first form of embodiment (FIGS. 1–6). This modified arrangement operates in a manner similar to that of the first form of embodiment, with the automatic control element 58 adapted to lock this portion 52a of deceleration element 50', instead of locking the first end 71 of rocking lever 70.

Without departing from the basic arrangement of the present invention, the movable deceleration element 50' could consist of only one portion of an annulus, the device operating in this case exactly as in the preceding forms of embodiment.

Also within the spirit of the invention, the automatic control element, such as 58, adapted to lock the deceleration element 50 or 50' at the end of each feed movement thereof in the direction of the arrow 54 may constitute the automatic control device controlling the step by step rotation of programme-cam unit 1 at a fast rate. Thus, the rotation of programme-cam unit 1 at a fast rate and the stopping of the rotational movement of reversing cam unit 2 will safely begin and terminate exactly at the same time.

Also without departing from the basic principle of the invention, the movable deceleration element 50 or 50' could be rectilinear instead of curved as shown in FIGS. 3–8. Similarly, this movable deceleration element could be arranged for operating not by frictional contact but by via inertia, without changing the final result.

What is claimed is:

1. A programmer control device comprising a programme-cam unit and a reversing cam unit disposed coaxially, adapted to be each driven for step by step rotation by means of at least a plurality of spring-loaded rocking pawls, the beak of each rocking pawl being adapted to cooperate with a toothed movable member kinematically connected to the corresponding cam unit, an automatic control element being adapted to control the step by step rotation of said programme-cam unit at a fast rate, wherein the beak of the pawl driving said reversing cam unit is kinematically connected via a lost-motion sliding coupling device to a movable deceleration element comprising a first portion of which the backward path, at the end of each forward movement of the pivoting pawl and deceleration element is adapted to be intersected by an automatic control element when simultaneously the step by step feed of said programme-cam unit is controlled at a fast rate, said lost-motion sliding coupling device consisting of a stud supported laterally by said pawl beak or said deceleration element and adapted to slide in an elongated slot formed in said deceleration element or said pawl beak, respectively, said elongated slot extending across the path of said deceleration element at the level of said pawl beak, in a direction such that on the one hand when the pawl beak drops behind each tooth of the corresponding toothed movable member, the path of said beak is inclined in relation to the longitudinal axis of said slot, whereby said stud and one longitudinal side of said slot are in mutual sliding contact and carry along said deceleration element backwards, and such that, on the other hand, after said deceleration element has been locked by said automatic control element, when said pawl pivots backwards, the path followed by the oscillating pawl is inclined in relation to the longitudinal axis of said slot and produces a relative sliding movement between said stud and said slot in a direction causing the pawl beak to move away from the teeth of the corresponding movable toothed member.

2. The programmer control device of claim 1, wherein said movable deceleration element comprises a first portion operatively connected via a lost-motion sliding coupling device to the beak of the pawl driving said reversing cam unit, and a second portion disposed adjacent to and ahead of said first portion, said second portion being constantly urged by resilient connecting means for engagement with said first portion, said second portion comprising an inner, rigid extension of which the backward path is adapted to be intersected by the automatic control element at the end of each forward movement of said rocking pawl and said movable deceleration element.

3. The programmer control device of claim 2, wherein said two portions of said movable deceleration element consist of sections of annuli disposed concentrically to said cam units and adapted to slide in frictional contact between the end of said reversing cam unit and a plate limiting the axial movement of said cam unit.

4. The programmer control device of claim 1, wherein said movable deceleration element consists of a unitary member of annular configuration or of one section of an annulus, disposed concentrically to said cam units and adapted to slide in frictional contact between the end of said reversing cam unit and a plate limiting the axial movement of said cam unit.

5. The programmer control device of claim 4, wherein the portion of said movable deceleration element, of which the backward path is adapted to be intersected by said automatic control element at the end of each feed movement of said rocking pawl and said movable deceleration element, consists of the first end of a rocking lever fulcrumed about a fixed pivot pin, the other end of said lever opposed to said first end being pivotally connected to said movable deceleration element.

6. The programmer control device according to claim 1, wherein said automatic control element adapted to lock said deceleration element at the end of each feed movement thereof constitutes the automatic control element controlling the step by step, fast-rate rotation of said programme-cam unit.

* * * * *